(12) United States Patent
Nagaralu et al.

(10) Patent No.: US 7,716,275 B1
(45) Date of Patent: May 11, 2010

(54) METHOD AND SYSTEM FOR IMPLEMENTING SHARED QUOTAS

(75) Inventors: Sree Hari Nagaralu, Pune (IN); Sunder Phani Kumar, Pune (IN)

(73) Assignee: Symantec Operating Corporation, Cupertino, CA (US)

(*) Notice: Subject to any disclaimer, the term of this patent is extended or adjusted under 35 U.S.C. 154(b) by 1437 days.

(21) Appl. No.: 10/930,576

(22) Filed: Aug. 31, 2004

(51) Int. Cl.
*G06F 12/00* (2006.01)

(52) U.S. Cl. .................. 709/203; 709/224; 709/228; 711/147; 711/153

(58) Field of Classification Search .......... 709/224, 709/223, 228, 203, 220; 711/147, 153
See application file for complete search history.

(56) References Cited

U.S. PATENT DOCUMENTS

| | | | |
|---|---|---|---|
| 5,946,686 A * | 8/1999 | Schmuck et al. ......... 707/10 |
| 6,832,248 B1 * | 12/2004 | Byrnes ................. 709/223 |
| 7,155,487 B2 * | 12/2006 | Yau et al. .............. 709/213 |
| 7,461,144 B1 * | 12/2008 | Beloussov et al. ....... 709/223 |
| 2002/0023156 A1 * | 2/2002 | Chujo et al. ........... 709/226 |
| 2004/0006706 A1 * | 1/2004 | Erlingsson ............ 713/200 |
| 2006/0020525 A1 * | 1/2006 | Borelli et al. .......... 705/34 |
| 2007/0002897 A1 * | 1/2007 | Goshen et al. ......... 370/468 |
| 2008/0256537 A1 * | 10/2008 | Fachan et al. .......... 718/1 |
| 2008/0256545 A1 * | 10/2008 | Akidau et al. ......... 718/104 |
| 2009/0276771 A1 * | 11/2009 | Nickolov et al. ....... 717/177 |

* cited by examiner

*Primary Examiner*—Khanh Q Dinh
(74) *Attorney, Agent, or Firm*—Campbell Stephenson LLP; Jonathan N. Gold

(57) ABSTRACT

Methods, systems, and apparatus can provide individual users of a computer system a means to share their quotas to resources accessible through that system. In one embodiment, this is accomplished, in part, by providing a shared quota descriptor understood by a file system and that can be manipulated by individual users. To that end, the present invention further provides individual users access to mechanisms by which to create and adjust shared quotas.

38 Claims, 8 Drawing Sheets

| ID | Quota | Rlist | Dlist | Usage | Free |
|---|---|---|---|---|---|
| A | 10 | - | - | 0 | 10 |
| B | 10 | - | - | 0 | 10 |
| C | 10 | - | - | 0 | 10 |

Figure 4A

| ID | Quota | Rlist | Dlist | Usage | Free |
|---|---|---|---|---|---|
| A | 10 | - | - | 5 | 5 |
| B | 10 | - | - | 6 | 4 |
| C | 10 | - | - | 3 | 7 |

Figure 4B

| ID | Quota | Rlist | Dlist | Usage | Free |
|---|---|---|---|---|---|
| A | 10 | B,C | - | 5 | 5 |
| B | 10 | - | A | 6 | 4 |
| C | 10 | - | A | 3 | 7 |

Figure 4C

| ID | Quota | Rlist | Dlist | Usage | Free |
|---|---|---|---|---|---|
| A | 10 | B,C | - | 5 | 5 |
| B | 10 | C | A | 6 | 4 |
| C | 10 | - | A,B | 3 | 7 |

Figure 4D

| ID | Quota | Rlist | Dlist | Usage | Free |
|---|---|---|---|---|---|
| A | 10 | B,C | - | 5 | 5 |
| B | 10 | C | A | 6 | 4 |
| C | 10 | - | A,B | 9 | 1 |

Figure 4E

| ID | Quota | Rlist | Dlist | Usage | Free |
|---|---|---|---|---|---|
| A | 10 | B,C | - | 5 | 4 |
| B | 10 | C | A | 6 | 4 |
| C | 10 | - | A,B | 11 | 0 |

Figure 4F

| ID | Quota | Rlist | Dlist | Usage | Free |
|---|---|---|---|---|---|
| A | 10 | B,C | - | 5 | 2 |
| B | 10 | C | A | 6 | 0 |
| C | 10 | - | A,B | 17 | 0 |

Figure 4G

| ID | Quota | Rlist | Dlist | Usage | Free |
|---|---|---|---|---|---|
| A | 10 | B,C | - | 5 | 0 |
| B | 10 | C | A | 8 | 0 |
| C | 10 | - | A,B | 17 | 0 |

Figure 4H

| ID | Quota | Rlist | Dlist | Usage | Free |
|---|---|---|---|---|---|
| A | 10 | B,C | - | 3 | 2 |
| B | 10 | C | A | 8 | 0 |
| C | 10 | - | A,B | 17 | 0 |

Figure 4I

| ID | Quota | Rlist | Dlist | Usage | Free |
|---|---|---|---|---|---|
| A | 10 | B,C | - | 3 | 5 |
| B | 10 | C | A | 8 | 0 |
| C | 10 | - | A,B | 14 | 0 |

Figure 4J

| ID | Quota | Rlist | Dlist | Usage | Free |
|---|---|---|---|---|---|
| A | 10 | B,C | - | 3 | 7 |
| B | 10 | C | A | 8 | 2 |
| C | 10 | - | A,B | 9 | 1 |

Figure 4K

METHOD AND SYSTEM FOR IMPLEMENTING SHARED QUOTAS

FIELD OF THE INVENTION

The field of this invention relates generally to computer operating systems. More particularly, the field of the invention relates to methods and systems for implementing shared quotas among users to resources on a computer system.

BACKGROUND OF THE INVENTION

Information drives business. The ready ability to store information, process information and to transmit information is a facet of operations that businesses rely upon to conduct their day-to-day activities. For businesses that increasingly depend upon data and information for their operations, an inability to store data, an inability to process data, or an inability to transmit data can hurt a business' reputation and bottom line. Businesses are taking measures to improve their ability to store data, process data, and transmit data, and to more efficiently share the resources that enable these operations.

In order to ensure availability of shared limited resources such as data storage, data processing, and data transmission bandwidth, businesses can restrict the amount of a shared resource that an individual user may consume. Such restrictions typically take the form of resource quotas imposed upon users of the resource and enforced by information systems administrators. With such quotas enforced, an individual user can use an amount of a quota-limited resource up to his or her quota, and generally no more than that. In some cases, there may be an overflow quota so that a user can temporarily consume an additional amount of the resource without requesting the overflow from system administration, and thus allowing the user to plan reduction of demand for the resource.

In the event that a user requires access to a quota-limited resource in an amount greater than the user's quota, the recourse has been to request additional quota from system management. Often, a user will have to pay an additional amount of capital to acquire an increase to the quota. Further, the task of administrating quotas takes up time and resources of system administrators.

One method that has been used to alleviate issues raised by imposition of individual quotas has been to enact group quotas. Often, users work together in groups on particular projects and the group (or the group administrator) pays for the resources members of the group consume. System administration can give a group administrator a group quota to be divided up among the various members of the group. Such a group quota often requires communal use of the resource, thereby breaking down individual ownership-based protections upon which users rely (i.e., restrictions to files). Further, in a situation where the group quota is not implemented through a communal area, but rather divided up as individual quotas, system administration must still be involved in any redistribution of quotas among the users.

What is therefore needed is a solution that permits multiple users to share individual quotas that does not break down individual protections associated with the consumption of resources associated with the quota. Further, it is desirable to implement a solution that avoids the intervention of system administration to adjust quotas among users participating in a shared quota in order to avoid consumption of system administration time and resources.

SUMMARY OF THE INVENTION

The present invention presents a method, system, and apparatus that provide individual users of a computer system a means to share their quotas to resources on that system. In one embodiment, this is accomplished in part by providing a shared quota descriptor understood by a file system and that can be manipulated by individual users. To that end, the present invention further provides individual users access to mechanisms to create and adjust shared quotas.

Accordingly, one aspect of the present invention provides a method for allocating to a first user a quota to a quota-limited resource and sharing that quota with a second user upon the request of the first user. In the context of this aspect of the invention, the quota is a limit on an amount of the quota-limited resource that may be consumed. This aspect of the invention further allows for consumption of the quota-limited resource to be associated with user ownership, permitting user-based privileges to be preserved.

Another aspect of the present invention provides a system including a resource shared by a plurality of users of the system and a shared quota of the resource. The shared quota can be contributed to by one or more of the plurality of users, shared by two or more of the plurality of users, and is a limit on a pooled amount of the resource that can be consumed.

A further aspect of the present invention is a filespace management system including a quota tracking module and a quota management module. The quota tracking module is coupled to a file system memory space for tracking usage of the file system memory space by one or more users against user quota allocations. The quota management module manages the quota allocations, which comprise individual user quotas and shared quotas.

Another aspect of the present invention provides a computer program product comprising signal bearing media bearing programming adapted to allocate a first user quota of a resource and to share the first quota with a second user upon request of the first user.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 4A-4K are shared quota tables that can be used in accordance with one embodiment of the present invention.

DETAILED DESCRIPTION

The present invention provides a means for users to share allocated quotas to a quota-limited resource available to a computer system in such a manner that such quota sharing is largely controlled by the individual users. In one embodiment, this is done, in part, by providing additional descriptors understood by a file system that can be manipulated by individual users to indicate recipients of shared quota, donors of shared quota, and the amount of quota a user wishes to reserve from sharing, if any. Once shared quotas are available to a user, that user can consume the quota-limited resource up to the amount available in the shared quota. The total amount of quota-limited resource that may be consumed by each user participating in the shared quota is the shared quota in addition to whatever quota amount has been reserved by each individual user participating in the shared quota. In one embodiment of the present invention, quota sharing can be controlled by individual users, thus avoiding the need for intervention by system administration; although, system administration can manipulate all quotas, shared and non-shared, if the need arises.

In the event that a user who has donated an amount of their individual quota to a shared quota desires to recover a portion of that quota, the present invention provides a mechanism to recover quota amounts being used by other users. Such a mechanism can include redistribution of the used quota among other donors to the shared quota and compressing resource usage in order to free up the desired amount of quota.

Figure 1A:
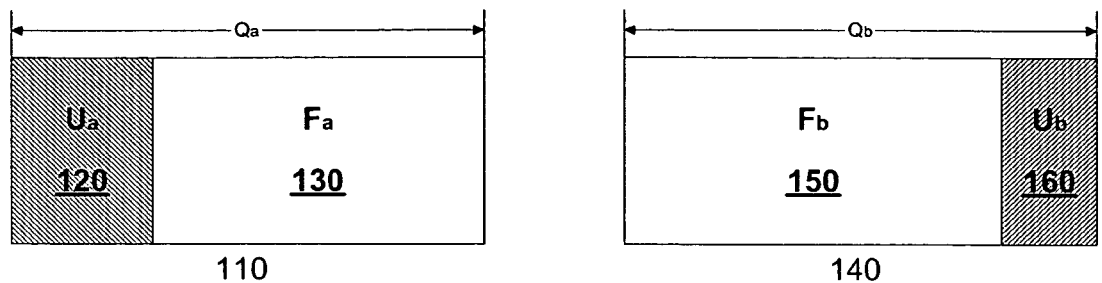
FIGS. 1A, 1B, and 1C are block diagrams illustrating the sharing of quotas among two users of a system.
Figure 1B:
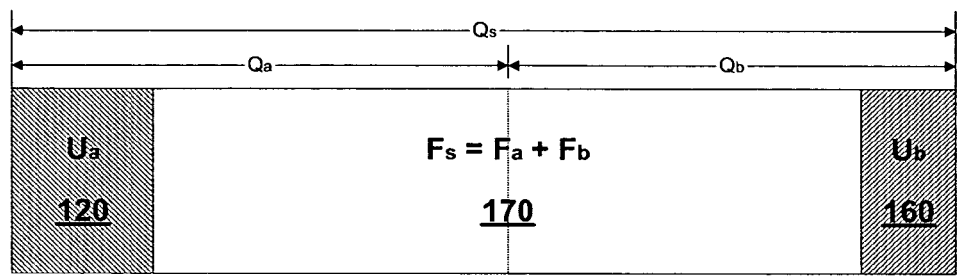
Figure 1C:
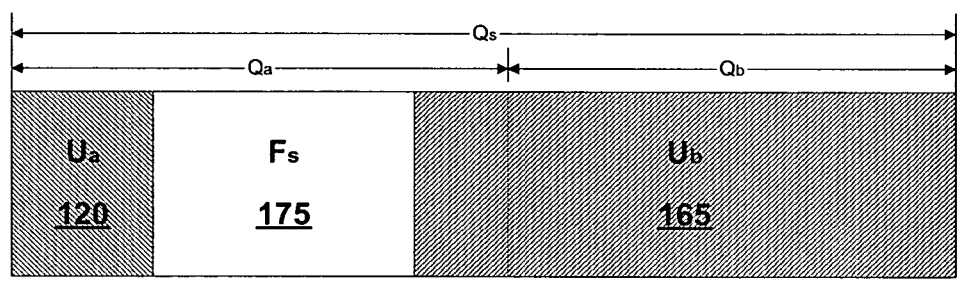

FIGS. 1A, 1B, and 1C illustrate a simple two-user instance of quota sharing. Users A and B respectively have quotas $Q_a$ (110) and $Q_b$ (140) to a resource. These quotas can be set by system administration. The resource may take the form of real or virtual data storage, data processing, or data transmission. For purposes of explanation, it will be presumed that quotas 110 and 140 represent file system memory space initially allocated to users A and B, respectively, it being understood that the present invention should not be limited thereto.

User A consumes a quantity 120 of the file system memory space corresponding to $U_a$ units of quota 110, while User B consumes a quantity 160 of the resource corresponding to $U_b$ of quota 140. User A therefore has a free amount, $F_a$, to consume of the resource, where $F_a=Q_a-U_a$ (130), and likewise User B has a free amount $F_b=Q_b-U_b$ (150).

The meaning of the term "consume" or "consumption" is dependant upon the resource being consumed. Where the quota-limited resource is virtual data storage (e.g., file system memory space), resource consumption means using a quantity of file system memory space to store data, wherein that quantity of file system memory space corresponds to a user's allocated quota or a portion thereof. Where the quota-limited resource is data transmission bandwidth, resource consumption means using a quantity of the data transmission bandwidth to transmit or receive data from a device, wherein that quantity of data transmission bandwidth corresponds to a user's allocated quota or a portion thereof. Where the quota-limited resource relates to data processing, resource consumption means using a quantity of data processing cycles to process data according to an application program, wherein that quantity of data processing cycles corresponds to a user's allocated quota or a portion thereof.

In order to add flexibility to their consumption of the quota-limited resource, users A and B can elect to share their quotas; thus allowing one user to consume the quota-limited file system memory space to a greater degree than his or her individual quota (i.e., $Q_a$ or $Q_b$) would allow. Of course, users sharing quotas are still restricted to the same overall amount of consumption of the quota-limited resource.

FIG. 1B illustrates the result of such a sharing of quota to a file system memory space between users A and B. In this situation, each user chooses to share that user's quota with the other user; that is A is sharing $Q_a$ with B, and B is sharing $Q_b$ with A. The shared quota, $Q_s$, equals $Q_a+Q_b$, but the actual amount of free shared file system memory space, $F_s$, equals $F_a+F_b=(Q_a-U_a)+(Q_b-U_b)$ (170). The pool of free file system memory space (170) available to each user is now greater than each individual's available free file system memory space had they not shared.

FIG. 1C illustrates an advantage of such quota sharing. User B can now consume an amount $U_b$ (165) of the quota-limited file system memory space that is greater than $Q_b$. This can be accomplished by consuming an amount of user A's quota, leaving $F_s$ (175) smaller than user A's original $F_a$ (130). User B does not have to pay more to enjoy this greater consumption (aside from any arrangements made with user A), and user B does not have to go through system administration in order to consume more of the quota-limited resource than $Q_b$. Moreover, file system memory space consumed by user B is not accessible to user A (or to other users) while it is consumed by user B, unless user B so chooses to extend such privilege to other users.

On the other hand, user A is now more restricted in the amount of quota-limited resources to which A can consume. User A can consume additional quota-limited file system memory space only to an amount limited by $F_s$. Should A require additional file system memory space beyond $F_s$, A will not be able to consume those resources unless A can reclaim quota from user B. Such reclamation methods can include requesting B to free up file system memory space corresponding to the shared quota, redistributing B's quota usage among other users that contribute to a shared quota (discussed in greater detail below), or compressing user B's usage of the quota-limited file system memory space in order to free up quota for A. Such compression could be accomplished by any of the well-known methods of data compression, as in for disk usage. Such compression can be done solely at the request of user A or at the request of user A as confirmed by user B. If user B refuses to allow data to be compressed, or if it is impossible to free up the resources requested by A, then user A cannot consume additional file system memory space until user B frees up the file system memory space or user A gets additional quota from system administration.

Figure 2A:
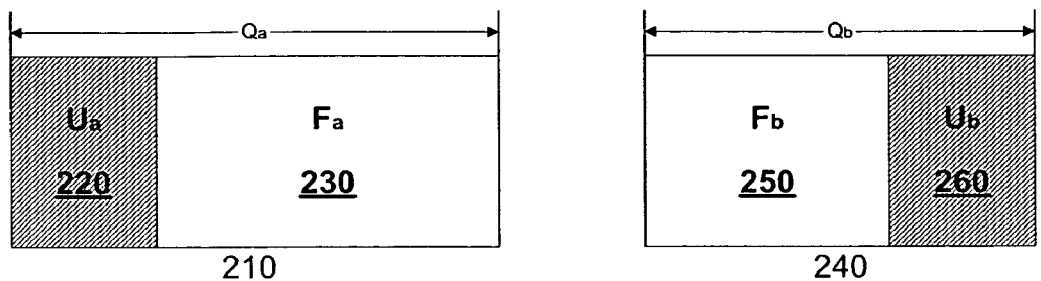
FIGS. 2A and 2B are block diagrams illustrating the sharing of quotas to a resource among two users of a system, where one user reserves a portion of that user's quota.
Figure 2B:
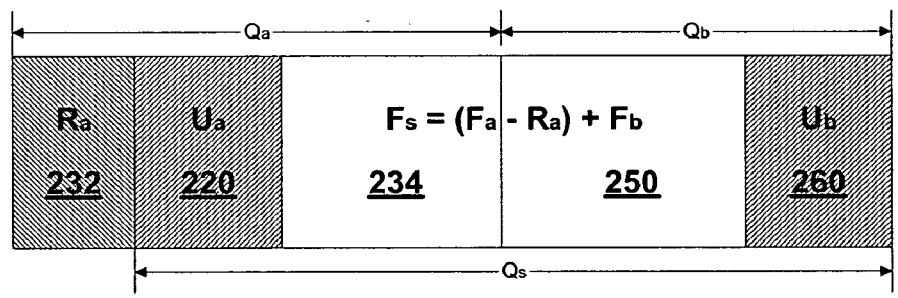

One way to alleviate possible tension between users A and B in a quota sharing arrangement is illustrated in FIGS. 2A and 2B. As in FIG. 1A, users A and B each respectively have quotas $Q_a$ (210) and $Q_b$ (240). Similarly, user A is using an amount of quota $U_a$ and has a free amount of quota $F_a=Q_a-U_a$. User B is using an amount $U_b$ and has a free amount $F_b$.

In FIG. 2B, users A and B decide to share their quotas as in FIG. 1B, but, user A opts to reserve a certain amount of quota, $R_a$ (232), that is not to be part of the shared quota. Therefore, the amount of free space $F_s$ that is part of the shared quota is now calculated as $F_s=(F_a-R_a)+F_b$ (shown as an aggregate of 234 and 250). As stated above, the act of reserving or withholding a portion of user A's quota from the shared quota, can provide user A additional flexibility in use of the quota-limited resource because user A will have a portion of quota that cannot be consumed by user B.

Figure 3A:
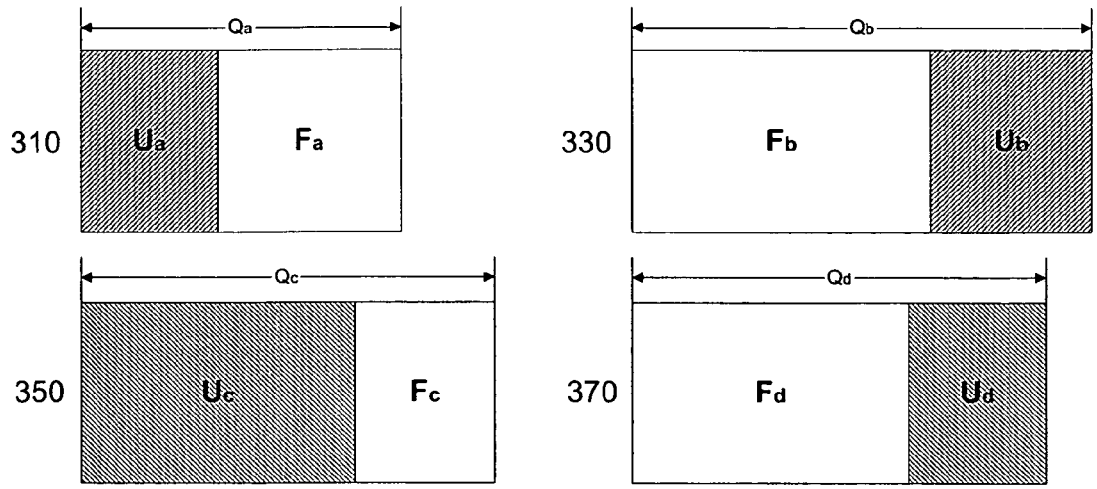
FIGS. 3A, 3B and 3C are block diagrams illustrating sharing of quotas of a resource among four users of a system.
Figure 3B:
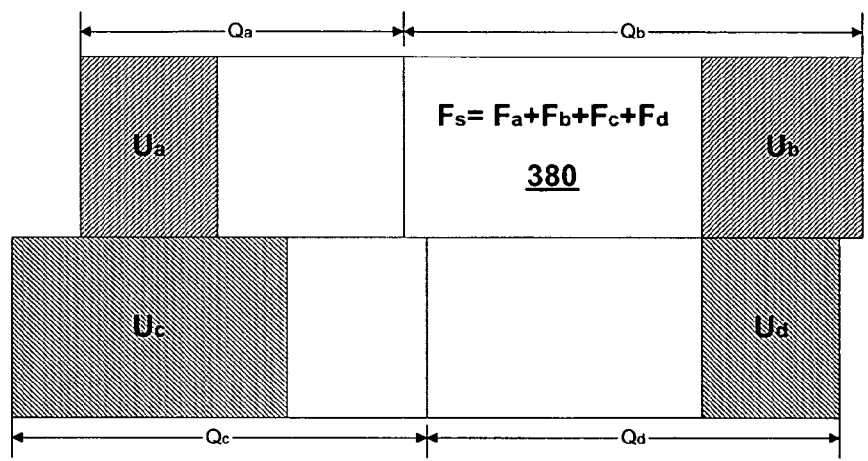
Figure 3C:
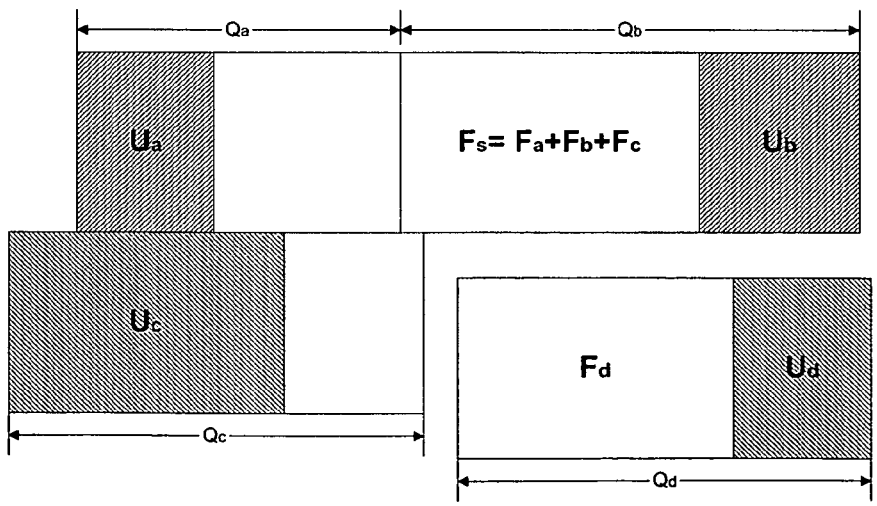

FIGS. 3A, 3B, and 3C illustrate an example of multiple-users sharing quota to a quota-limited file system memory space. User A has a quota $Q_a$ (310), user B has a quota $Q_b$ (330), user C has a quota $Q_c$ (350) and user D has a quota $Q_d$ (370). As with the previous examples, each user X is consuming a certain portion of their quota, $U_x$, and has a certain portion free, which is calculated as $F_x=Q_x-U_x$.

FIG. 3B shows an example where each of the four users opt to share their quotas with each of the others. This creates a shared free file system memory space, $F_s=F_a+F_b+F_c+F_d$. Again this pool of free file system memory space can be used by each user to the extent of $F_s$. As an individual user consumes additional file system memory space, the used quota can be subtracted initially from that user's free quota (i.e. if user A consumes additional quota then $F_a$ will be decreased). Once a user exceeds their own individual quota, consumption of the other user's quotas can be done in an equitable manner by splitting the additionally consumed quota units among each user. This can be done, for example, on a file-by-file basis when the quota-limited resource is a file system.

FIG. 3C shows a scenario in which four users share a pooled quota to a file system memory space, but not all four users contribute to the shared quota. In this figure, users A, B, C, and D all participate in sharing a pool of quota, but user D does not contribute any of user D's quota to the shared pool. Thus, the amount of available shared file space $F_s$ is calculated as $F_s=F_a+F_b+F_c$. User D shares in the free quotas of the other users, but the other users cannot share in user D's quota.

FIGS. 4A-4K illustrate an example of a quota table configured to allow sharing of quotas for a file space. The table includes entries for user ID, individual user's quotas, a list of user IDs corresponding to recipients of shared quota (Rlist), a list of user IDs who are donors to a shared quota of a user (Dlist), an individual user's usage of the quota-limited file space, and individual user's available free quota to the quota-limited file space.

FIG. 4A shows a table for three users A, B, and C. Each user has a quota of 10 units of file space and initially no usage (i.e., no consumption), so all 10 units are listed as free. FIG. 4B then shows A utilizing 5 of A's 10 units and therefore a usage of 5 and a listing of 5 free units. Similarly, B is using 6 units (4 free units) and C is using 3 units (7 free units).

FIG. 4C illustrates the table of FIG. 4B modified to reflect user A's decision to share quota with users B and C. Entries are made in user A's recipient list corresponding to users B and C, while entries are made in users B and C's donor list corresponding to the user ID for user A. These entries can be made by user A accessing an interface (i.e., a command line interface) to the file system that controls the file space. Such an interface can give user A the opportunity to see user A's quota statistics, and to grant other users access to the quota, or to otherwise adjust shared quota. An individual user, in general, could not adjust their total quota (i.e., $Q_a$ for user A) as allotted by the system administration.

Similarly, FIG. 4D shows the table of FIG. 4C updated to reflect user B's decision to share user B's quota with user C. An entry corresponding to user C is made in user B's recipient list, and an entry corresponding to user B is made in user C's donor list.

User C begins to have a demand for more of the quota-limited file space. In FIG. 4E, user C is shown as consuming nine quota units of the file space. All of these additional units are taken out of user C's free quota. User C continues to have increased demand for the quota-limited file space and the table in FIG. 4F shows user C using 11 units of the file space. However, since user C only had 10 units of quota, the additional file space demand is subtracted from user A's free quota (leaving user A four free units of quota). User C continues to have increased demands for the quota-limited file space, and in FIG. 4G is shown as using 17 quota units of the file space. Such usage of quota has been subtracted from the free quotas of both users A and B, leaving user A, in this example, with two free units and user B with no free units.

FIG. 4H demonstrates what happens when user B now needs more of the quota-limited file space, even though user B has no quota available. Since user B is entitled to share user A's quota, user B can consume user A's two free quota units. At this point, none of users A, B and C have any free units, and therefore none of these users can consume any more of the quota-limited file space until the users free up the resource.

In FIG. 4I, user A decreases user A's demand on the quota-limited file space, thus freeing up two quota units. Since user A shares user A's quota with users B and C, the freed-up units are now available to all three users.

In FIG. 4J user C decreases demand on the quota-limited file space, freeing up three units. As shown in this table a preference is made to return those three units to users from which user C is sharing quota and not to user C's own quota. In this scenario, all three returned units are given to user A. Such an example is not meant to restrict the mechanism of quota return as contemplated by the present invention. Quota can be returned to users in the donor list in a round-robin fashion, in a fashion corresponding to the quota taken when the particular restored portion of the quota-limited file space is freed up, or to donor users who have fewer available quota units.

In FIG. 4K, user C has decreased demand for the quota-limited file space below limits set by user C's own quota, and therefore frees up all shared units to users A and B. This restoration of units to users A and B also results in a restoration of user A's units consumed by user B, so that user A now can consume all units of user A's quota.

Figure 5:
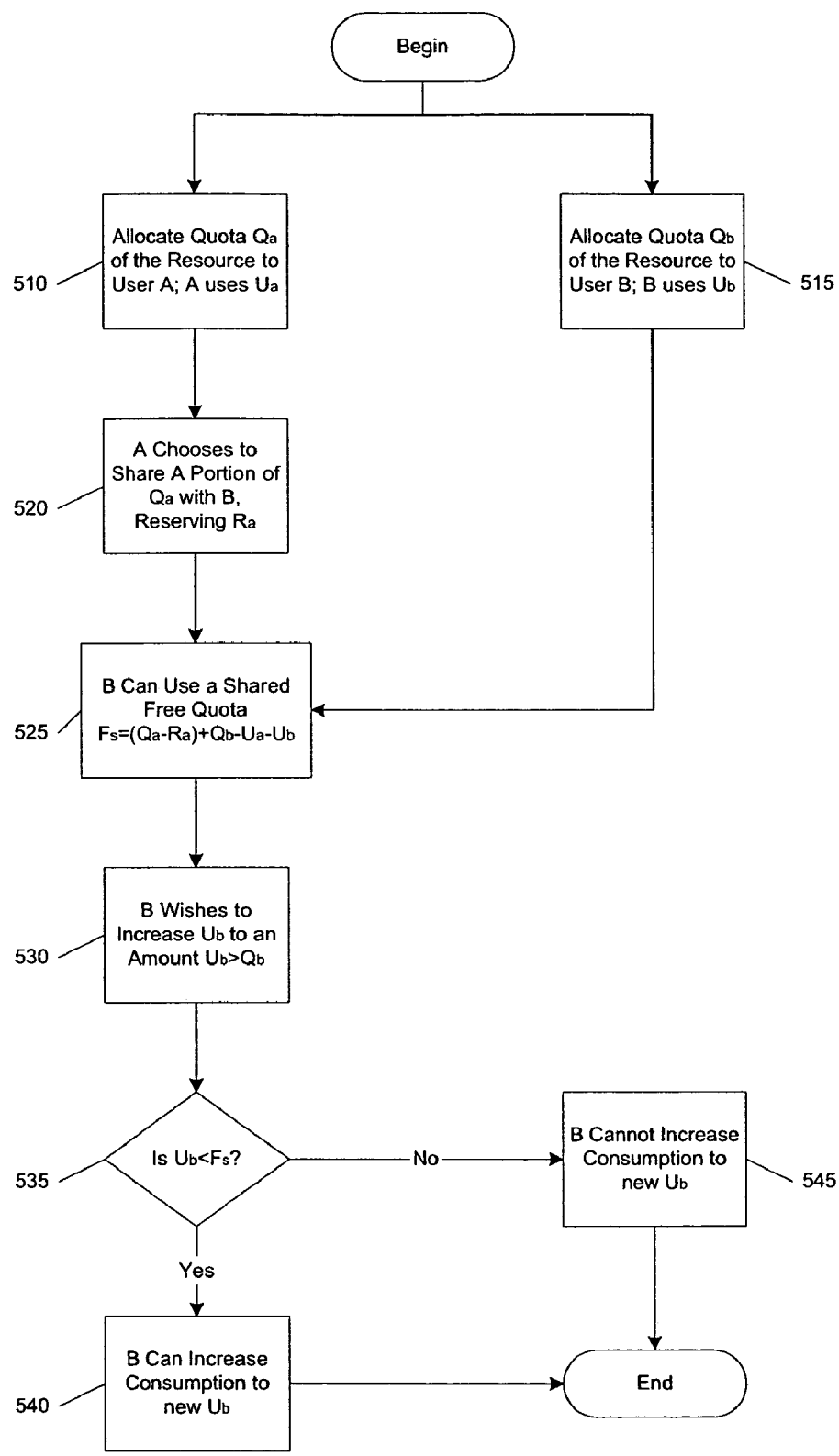
FIG. 5 is a flowchart of the actions taken in sharing and using quotas in accordance with one embodiment of the present invention.

FIG. 5 is a flowchart illustrating an example of the creation and use of shared quotas between a user A and a user B. A quota $Q_a$ for a quota-limited resource is allocated to user A and user A uses an amount $U_a$ of that quota (510). Likewise, a quota $Q_b$ to the quota-limited resource is allocated to user B and user B uses a quantity $U_b$ of the quota-limited resource (515).

User A can choose to share a portion of $Q_a$ with B, and if so desired, reserving a portion $R_a$ that is not shared with user B (520). User B can then use an amount of the quota limited resource limited by a free space in the shared quota, $F_s=(Q_a-R_a)+Q_b-U_a-U_b$ (525). It should be noted that at this point user B is not donating quota to user A, so user A's usage is limited to an amount of the quota-limited resource corresponding to $Q_a$.

User B's demands on the quota-limited resource can now increase to an amount greater than $Q_b$ (530). It must now be determined, however, whether a desired $U_b$ is less than $F_s$ (535). If $U_b$ is less than the available shared quota, then user B can increase consumption to the new $U_b$ (540). However, should the new $U_b$ be greater than the amount of available shared quota, then user B cannot increase user B's consumption to the new $U_b$ (545). At this point, user B decides whether user B can perform tasks while keeping $U_b$ less than $F_s$, or find a way to get access to a larger quota for the quota-limited resource.

Figure 6:
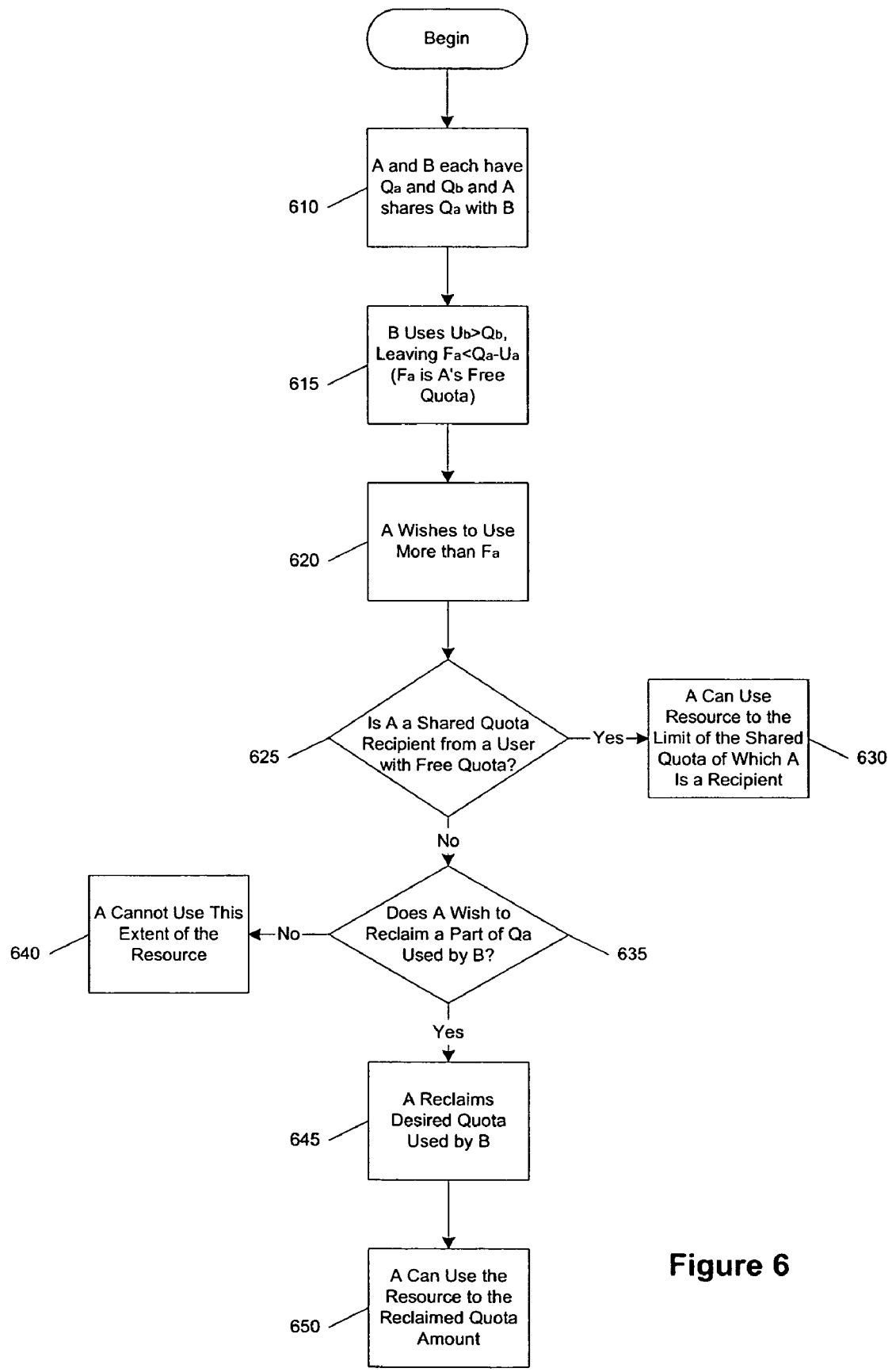
FIG. 6 is a flowchart of the actions taken in reclaiming quotas in accordance with one embodiment of the present invention.

FIG. 6 is a flowchart demonstrating an example where a user donating resources to another user seeks to reclaim a portion of that donated resource quota. In this example, users A and B each have quotas $Q_a$ and $Q_b$ respectively and user A shares $Q_a$ with user B (610). During the course of this sharing arrangement, user B uses an amount $U_b$ greater than $U_b$, leaving an amount of quota available to user A, $F_a$, less than $Q_a-U_a$ (615). That is, user A's free quota is now less than what user A would have had in a nonsharing arrangement.

Should user A wish to use more than the amount of free space available to A, but less than user A's total quota (620), it can be determined whether user A is a shared quota recipient from a user having available quota (625). If so, then user A can use the quota-limited resource to the limit of the available shared quota of which A is a recipient (630). If, however, user A is not a shared quota recipient from a user with available quota, then A is presented with the decision of whether A wishes to reclaim a part of $Q_a$ consumed by user B (635). If not, then user A cannot use the desired extent of the quota-limited resource (640), and will have to adjust requirements accordingly. If user A does desire to reclaim a desired amount of quota it can do so (645). As stated above, such reclamation can take the form of redistributing user B's quota useage among any other users sharing quota with user B, or compressing B's useage of the quota limited resource in such a fashion that such compression frees up the quantity of quota desired by A. Once the quota has been reclaimed by user A, then user A can use the quota-limited resource to the limit of quota reclaimed (650).

As shown above, the present invention can be implemented using a variety of computer systems and networks. An example of one such computing and network environment is described below with reference to FIGS. 7 and 8.

An Example Computing and Network Environment

Figure 7:
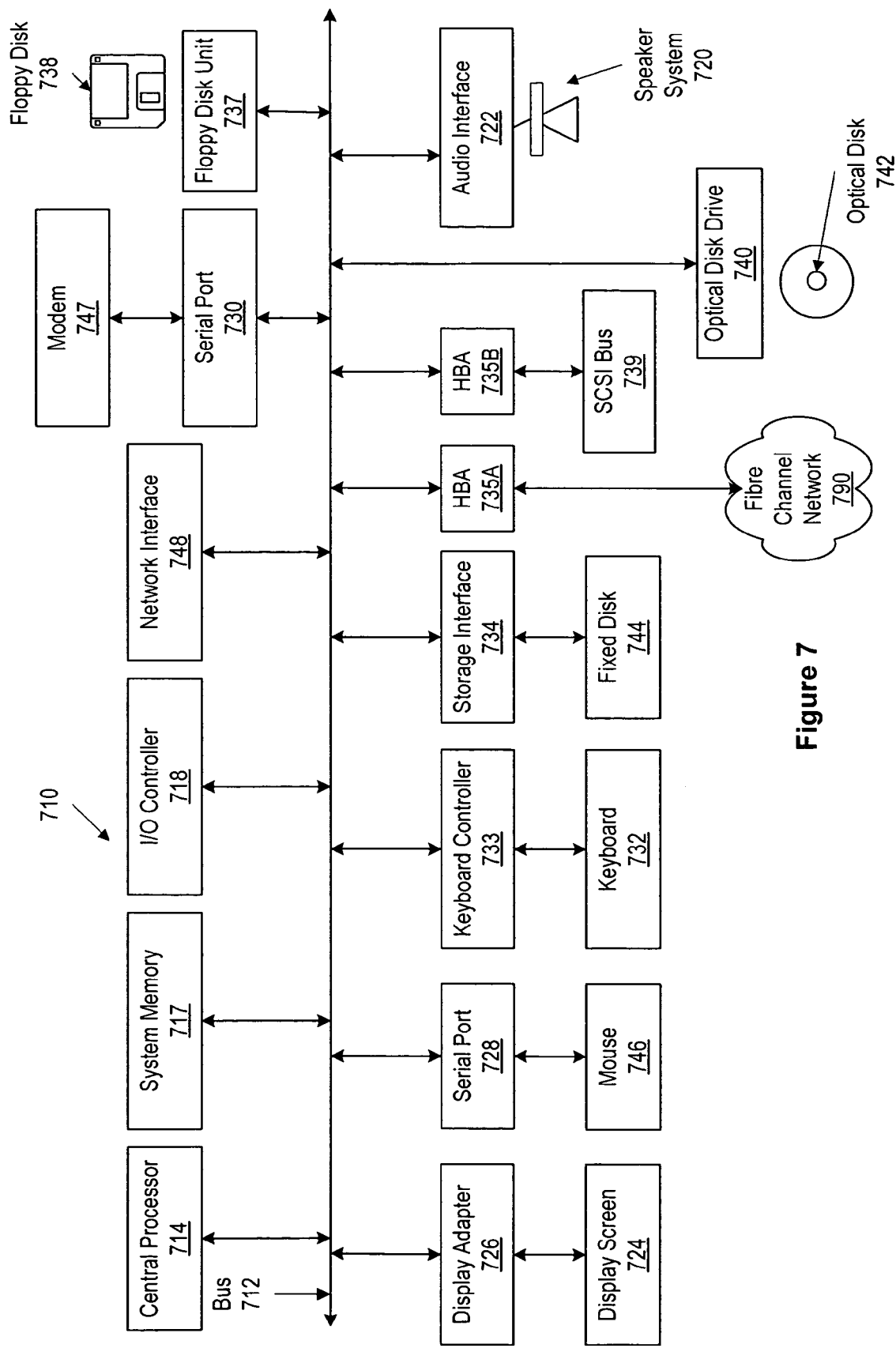
FIG. 7 is a block diagram illustrating a computer system suitable for implementing embodiments of the present invention.

FIG. 7 depicts a block diagram of a computer system 710 suitable for implementing the present invention. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a fibre channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 7 need not be present to practice the present invention. The devices and subsystems can be interconnected in different ways from that shown in FIG. 7. The operation of a computer system such as that shown in FIG. 7 is readily known in the art and is not discussed in detail in this application. Code to implement the present invention can be stored in computer-readable storage media such as one or more of system memory 717, fixed disk 744, optical disk 742, or floppy disk 738. Additionally, computer system 710 can be any kind of computing device, and so includes personal data assistants (PDAs), network appliance, X-window terminal or other such computing devices. The operating system provided on computer system 710 may be MS-DOS®, MS-WINDOWS®, OS/2®, UNIX®, Linux®, or another known operating system. Computer system 710 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
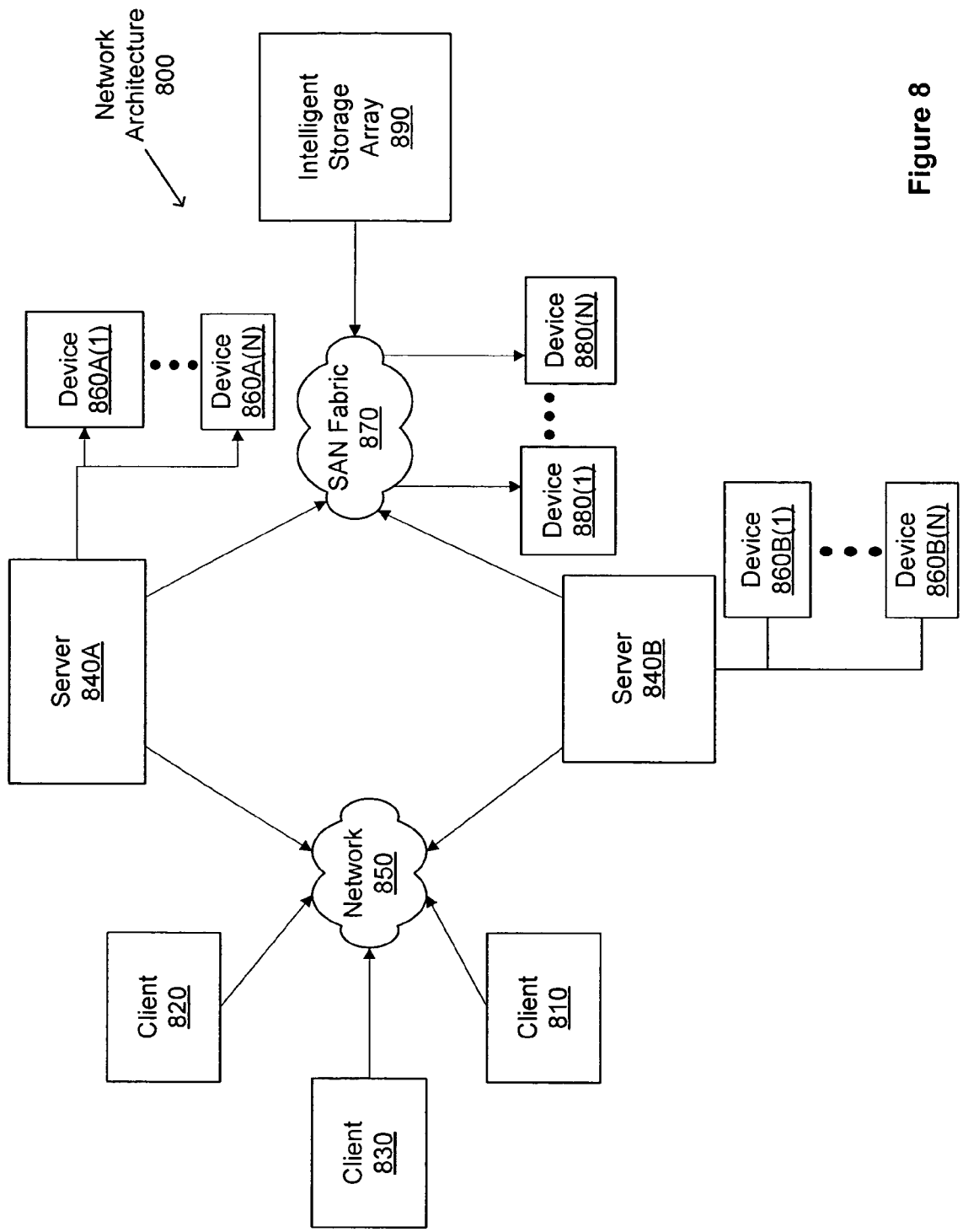
FIG. 8 is a block diagram illustrating a network environment in which file splitting according to embodiments of the present invention may be used.

FIG. 8 is a block diagram depicting a network architecture 800 in which client systems 810, 820 and 830, as well as storage servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   allocating, by a server, to a first user a first quota of a resource,
   wherein the first quota is a limit on an amount of the resource that may be consumed;
   allocating to a second user a second quota of the resource; and
   sharing a portion of the first quota with the second user, wherein the sharing is in response to a quota allocation by the first user, in response to the quota allocation an available amount of the resource to the second user is increased above the second quota consumption of the resource by the second user in excess of the second quota decreases the available amount of the resource to the first user,
   consumption of the resource by the first user is associated with the first user and consumption of the resource by the second user is associated with the second user.

2. The method of claim 1 further comprising:
   permitting the second user to consume a quantity of the resource limited by the second quota and the shared portion of the first quota.

3. The method of claim 1 further comprising:
   permitting the second user to consume a quantity of the resource limited by the second quota and an unconsumed amount of the shared portion of the first quota;
   wherein,
   the unconsumed amount of the shared portion of the first quota is limited by an amount of the shared portion of the first quota consumed by the first user.

4. The method claim 1 further comprising:
reclaiming a selected quantity of the shared quota consumed by the second user upon request of the first user.

5. The method of claim 4, wherein the reclaiming comprises:
redistributing the selected quantity of the shared quota consumed by the second user to a shared portion of a third quota, wherein a third user shares the shared portion of the third quota with the second user.

6. The method of claim 4, wherein the reclaiming comprises:
compressing the second user's consumption of the resource in order to make available the selected quantity of the shared quota.

7. The method of claim 1 further comprising: ceasing the sharing of the portion of the first quota with the second user.

8. The method of claim 7, wherein the ceasing is done at the request of the first user.

9. A system including a computer processor coupled to a memory comprising:
a resource shared by a plurality of users of the system;
a shared quota of the resource, wherein the shared quota is contributed to by one or more contributing users of the plurality of users in response to an allocation by the one or more contributing users of an individual quota of the resource associated with each contributing user;
the shared quota is shared by two or more sharing users of the plurality of users, the shared quota is a limit on a pooled amount of the resource that can be consumed,
consumption of the resource by a first sharing user is associated with the first sharing user,
consumption of the resource by a second sharing user is associated with the second sharing user, and
consumption of the resource by the first sharing user in excess of the first user's individual quota decreases an amount of the resource controlled by the shared quota available to the second sharing user.

10. The system of claim 9 further comprising:
a first user quota allocated to a first contributing user, wherein the first contributing user contributes a first contributed portion of the first user quota to the shared quota.

11. The system of claim 10 further comprising:
a second user quota allocated to a second contributing user, wherein the second contributing user contributes a second contributed portion of the second user quota to the shared quota.

12. The system of claim 10, wherein one of the sharing users can consume the resource up to a limit comprising: a user quota allocated to the sharing user, and an available portion of the shared quota.

13. The system of claim 12, wherein the available portion of the shared quota is that portion of the shared quota not consumed by any of the plurality of users.

14. The system of claim 11 further comprising:
a reclamation unit, wherein the reclamation unit is configured to reclaim a portion of the first contributed portion of the first user quota from the shared quota.

15. The system of claim 14, wherein the reclamation unit reclaims the portion of the first contributed portion of the first user quota by reallocating a consumed portion of the first contributed portion to the second contributed portion.

16. The system of claim 14, wherein the reclamation unit reclaims the portion of the first contributed portion of the first user quota by compressing a sufficient quantity of data to make available the portion to be reclaimed.

17. The system of claim 9, wherein the resource is memory space of a file system.

18. The system of claim 9, wherein the resource is network data transmission bandwidth.

19. The system of claim 10 further comprising:
a quota tracking unit, wherein the quota tracking unit tracks the shared quota, and an individual quota for each of the sharing users.

20. The system of claim 19 wherein the quota tracking unit further comprises:
a quota data file comprising a quota for the first contributing user, a usage of the quota for the first contributing user, and a list of sharing users to share the shared quota.

21. The system of claim 20 wherein the quota data file further comprises:
a list of contributing users who contribute to the shared quota.

22. A filespace management system including a computer processor coupled to a memory comprising:
a quota tracking module coupled to a file system memory space for tracking resource usage by one or more users of the file system memory space against respective user quota allocations wherein the resource is shared by the one or more users;
a quota management module coupled to the quota tracking module for managing quota allocations, wherein the quota allocations comprise an individual quota for each of the one or more users, and
a shared quotas allocated, wherein the consumption of the shared quota by a first user is associated with the first user,
wherein the consumption of the shared quota by a second user to be associated with the second user, and
wherein the consumption of the resource by the first user in excess of the first user's individual quota decreases an amount of the resource controlled by the shared quota available to the second user.

23. The filespace management system of claim 22, wherein the quota tracking module comprises: a quota data file comprising
a list of users of the file system memory space,
individual user quota allocations corresponding to respective users of the system memory space,
for one user of the file system memory space, a list of donee users with which the user shares that user's quota allocation,
individual user file system memory space usage corresponding to respective users of the file system memory space.

24. The filespace management system of claim 23, wherein a shared quota of a user comprises a composite of all quotas shared with the user.

25. The filespace management system of claim 24, wherein a total quota available to the user comprises the shared quota and the individual user quota allocation corresponding to that user.

26. The filespace management system of claim 22, wherein the quota management module is configured to allow the first user to share the quota allocation of the first user with the second user.

27. The filespace management system of claim 26, wherein the quota management system is configured to allow the first user to reclaim a portion of the shared quota allocation from the second user.

28. The filespace management system of claim 26, wherein the quota management system is configured to allow the first user to cease sharing the quota allocation of the first user with the second user.

29. The filespace management system of claim 22, wherein the quota management system is configured to allow a first user to share a portion of the quota allocation of the first user with a second user.

30. The filespace management system of claim 29, wherein the quota management system is configured to allow the first user to adjust the portion of the quota allocation of the first user shared with a second user.

31. A computer program product comprising:
    computer readable storage media bearing programming adapted to allocate to a first user a first quota of a resource, wherein the first quota is a limit on an amount of the resource that may be consumed, allocate to a second user a second quota of the resource and
    share a portion of the first quota with the second user upon, wherein the sharing is in response to a quota allocation by the first user,
    in response to the quota allocation an available amount of the resource to the second user is increased above the second consumption of the resource by the second user in excess of the second quota decreases the available amount of the resource to the first user for consumption of the resource by the first user is associated with the first user and consumption of the resource by the second user is associated with the second user.

32. The computer program product claim 31 further comprising:
    computer readable storage media bearing programming further adapted to permit the second user to consume a quantity of the resource limited by the second quota and the shared portion of the first quota.

33. The computer program product of claim 31 further comprising:
    computer readable storage media bearing programming further adapted to permit the second user to consume a quantity of the resource limited by the second quota and an unconsumed amount of the shared portion of the first quota;
    wherein, the unconsumed amount of the shared portion of the first quota is limited by an amount of the shared portion of the first quota consumed by the first user.

34. The computer program product of claim 31 further comprising:
    computer readable storage media bearing programming further adapted to reclaim a selected quantity of the shared quota consumed by the second user upon request of the first user.

35. The computer program product of claim 34 further comprising:
    computer readable storage media bearing programming further adapted to redistribute the selected quantity of the shared quota consumed by the second user to a shared portion of a third quota, wherein a third user shares the shared portion of the third quota with the second user.

36. The computer program product of claim 34 further comprising:
    computer readable storage media bearing programming further adapted to compress the second user's consumption of the resource in order to make available the selected quantity of the shared quota.

37. The computer program product of claim 31 further comprising:
    computer readable storage media beating programming further adapted to cease the sharing of the portion of the first quota with the second user.

38. The computer program product of claim 37, wherein the ceasing is done at the request of the first user.

* * * * *